Patented July 30, 1929.

1,722,307

UNITED STATES PATENT OFFICE.

LESLIE W. NAYLOR, OF FLORENCE, COLORADO, ASSIGNOR TO CONTINENTAL OIL COMPANY, OF DENVER, COLORADO, A CORPORATION OF MAINE.

PROCESS FOR DEWAXING OILS.

No Drawing. Application filed June 7, 1927. Serial No. 197,233.

This invention relates to the separation of solids from solvent liquids and particularly to the separation of mineral wax, such as paraffin, from a mixture of such wax and a petroleum oil.

In refining crude petroleum oil, the crude material is distilled to remove the lighter fractions. This results in a concentration of the paraffin wax and the heavy oils in the still bottom. In ordinary distillations the wax begins to come off from the still at about 600° F. and continues up to about 750° F. It may be removed at lower temperatures by admitting steam into the still during the distillation. This steam distillation is often desirable, for the oils which are left after the removal of wax are not thereby subjected to such high temperatures as when steam is not used. These heavier oils are valuable lubricating oils, and their value is enhanced when they are not burned by the higher temperatures and when they are freed from the paraffin wax.

The paraffin wax distillate also contains some oil as well as wax. The paraffin in the distillate is usually described as being crystalline in character, and in this form it has a characteristic repelling action on the oil with which it is admixed. This lack of affinity makes it easy to separate the oil and the paraffin wax by filter press means and by sweating processes. The crystalline character of the distilled wax and the repellant action towards oil are to be distinguished from the amorphous form of the same wax before distillation and the action of the amorphous form towards oil. The amorphous form has an affinity rather than a repellant action for the oil. Such mixtures of the amorphous wax and oil, of which petrolatum is one example, cannot be subjected to filter press operations and to sweating processes.

For various reasons it is an established practice in the art to stop the distillation of the crude product short of the point where the paraffin wax is distilled. This leaves in the still all the paraffin and the heavier oils, which mixture is termed a "long cut residuum," containing about 75% of the original wax content. To separate the wax and oil from long cut residua, the art recognizes two generally practiced methods. Both methods operate upon somewhat the same principle: first, a treatment to convert the wax into the solid form in suspension in a liquid containing the oil, and second, a separation of the solid wax and the liquid which is dependent upon a difference in the specific gravities of the wax and the liquid. The two processes now practiced employ respectively a gravity separation and a centrifugal separation. The first treatment of the long cut residuum consists of a dilution, usually with naphtha, and a cooling. The dilution has a two-fold object, one, to reduce the solubility of the paraffin wax in the resultant liquid, and, two, to alter the specific gravity of the containing liquid so that the wax will settle out as the heavier product. In the long cut residuum the wax has a lower specific gravity than the oil. Therefore, a sufficient quantity of a diluent which has a still lower specific gravity is employed for mixture with the heavier oil to form a wax-containing liquid which is lighter in gravity than the wax which is to be solidified in the liquid. The proper diluent is one which will aid in rendering the wax-containing liquid a poor solvent for the wax at some operable temperature. The cooling is resorted to for the purpose of lowering the solubility and to attain the operable temperature referred to. During the cooling the wax becomes less and less soluble and separates in some form from the solution. The separation is not clear cut like the separation of a salt from water, but it is of quite a different nature, the remaining solvent having a characteristic sustaining power to prevent settling of the wax.

The cooling process of the prior art requires time in order to produce a form of wax which is capable of separating by sedimentation or which may be removed by centrifugal means. The slow cooling must be carried out without disturbance. It has been recommended that the cooling be no faster than two to three degrees Fahrenheit per hour. The quiescent cooling is usually effected by cooling coils placed at the top of the liquid in a large tank. Temperature differences in the solution cause slow convection currents which provide a minimum of circulation to bring the bottom portion to the cooling coils. Under these conditions the contents of the tank are never at a uniform temperature. The wax precipitates out on the cooling coils and the coating there formed interferes with the transfer of heat and the circulation.

The present invention aims to overcome the various disadvantages above mentioned and provides a method for the separation of wax and oil in long cut residua which permits shortening the time of the process, and produces a quicker, cleaner and more perfect separation of wax. The improved process employs an addition agent which assists and accelerates the natural separation of wax and liquid. The use of the addition agent permits both shock-chilling and agitation to be employed in the first treatment. The shock-chilling decreases the time of the process from several days to several hours. The permitted agitation results in a circulating mass which is thereby made substantially uniform throughout in character and in temperature. The cooling surfaces are kept cleaner and the heat transfer is thus increased.

Another feature of the process is the use of an addition agent which is not wasted in the process, but which may be used again after recovery.

The present invention lies not only in the use of the addition agent as an aid or stimulant to hasten and increase the natural tendency of the wax to become insoluble in the solution, but also in the shock-chilling combined with such use. In order better to explain the nature of the invention the following illustrative example is given.

A long cut residuum from a paraffin-base petroleum crude is first filtered through fuller's earth or treated by other process to remove certain asphaltic substances contained therein. Such substances hinder the separation of the wax from the oil and are preferably removed, although the removal is not necessary to the success of the present process. The treated residuum is then diluted with naphtha which is employed in quantity approaching about 70% of the resulting mixture. The diluted mixture at about 80° F. is then cooled with agitation to about 14° F. in a period of about twelve hours. Compared to the quiescent cooling of three days duration, a period of twelve hours is considered to be a shock-chilling period. After cooling, about 5% litharge by volume is added, and within three hours, sedimentation of the wax is complete. The litharge and the wax are to be found together at the bottom of the container as a coagulated mass of paraffin on nuclei of litharge particles.

In the foregoing process the wax is gathered up by the litharge to form a wax-yielding product. The great weight of the litharge rapidly settles the mass. The wax-litharge product is then separated from the supernatant liquid and the wax is then removed from the litharge. This is accomplished preferably by washing with gasolene. The recovered litharge is unchanged and is suitable for re-use. It may be added to the diluted residuum before cooling, as it is equally as effective when added at this point as when added after the cooling has been completed. New litharge also may be added before cooling without changing the character of the process.

Various modifications of the above process have been carried out. For example, the cooling period has been prolonged to twenty-four hours and no difference in the result has been observed. This indicates that various degrees of shock-chilling may be practiced. It is important to observe that the use of litharge during the settling stage is the factor which permits shock-chilling to be employed. Without litharge the shock-chilled mass will not settle. It is known also that a period of six hours is a satisfactory shock-chilling time.

A variation of litharge above and below 5% by volume has been practiced in the above process and it has been observed that for a given mixture a reduction below the 5% gives a rate of settlement which is correspondingly reduced. Using 10% and 15% gives no better sedimentation than the 5%. The invention therefore contemplates the use of litharge in quantities which do not exceed that amount which is necessary to secure the maximum effect. An excess of course will increase the adherent oil-naphtha mixture, but otherwise it does no harm, since the addition material is recoverable and therefore not wasted.

Not only litharge but other lead oxides will produce the effect. Litharge in the form of the commercial grades of the product, is the preferred material to be used in the present invention. Other lead compounds such as lead sulphate and lead sulphide exhibit the property of wax precipitation to some degree but are not as efficient as litharge. I have found that the property is not characteristic of all minerals, oxides or other inert and comminuted substances, but I am unable to state with assurance the fundamental cause for the greater success of litharge among the various materials that I have employed.

There are certain things that I have learned about litharge in practicing the invention. All grades of litharge are not equally effective. Commercial litharge without any treatment is quite satisfactory and reliable. Although I am aware that litharge is technically considered to be the oxide designated PbO, it is quite probable that it contains other oxides and that there are different physical forms for the same chemical forms. I know that the product of one manufacturer of litharge is better than the product of another for the purpose of the present invention, and that the better grade of the two is more crystalline in character. I have passed this better grade through a 200 mesh screen and have ascertained that the fines are suitable for the process and that the coarse particles are not suitable. The latter drop to the bottom of a tank without collecting any paraffin. The degree of fineness therefore has a bearing upon the success of litharge and for one commercial grade, at least, a fineness of 200 mesh or greater is sufficient.

I have also ascertained that excess moisture has a detrimental effect upon the action of the litharge. The commercial grades do not have a harmful content of moisture. Recovered litharge, however, may contain moisture gathered in the settling process or in the recovery process. Since sedimentation of the wax by the use of litharge according to the present invention is practiced usually between the temperatures of 15° above and 15° below zero on the Fahrenheit scale, the moisture in the materials is present as "frost". This may contaminate the litharge and appear in the recovered material as moisture. Therefore, it may be desirable to dry the recovered litharge before re-use.

As to the nature of the action taking place nothing definite can be stated. The effect has the appearance of being a combination of the special character and great weight of lead compounds, the physical form, the degree of dryness, and the degree of fineness as combined in and exemplified by commercial varieties of litharge. Colloidal precipitation has been suggested as an explanation, but I do not claim that it is such. All that I am able to say concerning this is that the oil-wax naphtha solution acts like a colloidal solution at temperatures near the congealing point of the wax particles; and that litharge acts like a coagulant in a colloidal solution causing the finely divided wax to coagulate and settle with the heavier litharge.

The invention, therefore, contemplates the separation at congealing temperatures of substances which act like amorphous paraffin wax and a properly diluted heavy oil in the presence of a substance which acts towards the solid as litharge acts towards paraffin wax in the sustaining solvent.

I do not claim that shock-chilling is an essential step in the process, but only that it is a desirable and permissible step, made possible by the precipitation step. The permissibility of the shock-chilling step is one of the prominent advantages of the invention. I therefore consider the shock-chilling step in combination with the precipitation step as a new and valuable process of de-waxing oils, especially the long cut residua and similar mixtures of amorphous or like-acting waxes and oils. As applied to the long cut residua the present process gives an increased quantity of purer amorphous paraffin and a lower cold-test oil. The process is more flexible than the older process, for by varying the temperature of separation the extent of the separation of the wax and the oil may be readily controlled with rapidity and assurance, as a result of the rapid settling, with cleaner and more perfect separation of the wax.

I claim:

1. The method of treating a long cut residuum for separation of wax and oil which comprises adding to the residuum sufficient diluent capable of rendering the wax content incompletely soluble at a low temperature, cooling the diluted mixture to such temperature, and precipitating the wax from the sustaining solvent by the influence of particles of litharge.

2. The method of treating a long cut residuum for the separation of wax and oil which comprises adding to the residuum sufficient diluent capable of rendering the wax content incompletely soluble at a low temperature, cooling the diluted mixture to such temperature, and precipitating the wax from the sustaining solvent by the influence of particles having the precipitating properties of litharge.

3. The method of de-waxing which consists of shock-chilling a diluted long cut residuum from the distillation of a paraffin-base petroleum, and allowing the insoluble paraffin to collect and precipitate in the presence of particles of litharge.

4. The method of de-waxing which consists of shock-chilling and agitating a diluted long cut residuum from the distillation of a paraffin base petroleum, and allowing the insoluble paraffin to collect and precipitate in the presence of particles of litharage.

5. The method of de-waxing which consists of shock-chilling a diluted long cut residuum from the distillation of a paraffin base petroleum, and allowing the insoluble paraffin to collect and precipitate in the presence of particles having the precipitating properties of litharge.

6. The method of separating wax from a mixture of amorphous paraffin and oil which consists of adding a diluent to the mixture, cooling the diluted mixture to a temperature below the solubility limit of the contained paraffin, and separating the wax from the solvent in the presence of an addition agent having the precipitating characteristics of litharge.

7. The method of separating wax from a diluted mixture of amorphous paraffin and oil which consists of shock-chilling the mixture to a wax-congealing temperature, and separating the wax from the solvent in the presence of solid particles having the precipitating properties of litharge.

8. A wax-yielding product comprising paraffin wax in coagulated form upon nuclei of particles of litharge.

9. A wax-yielding product comprising paraffin wax in coagulated form upon nuclei of solid particles having the precipitating qualities of litharge.

10. A wax-yielding product comprising amorphous paraffin wax in coagulated form upon nuclei of particles of litharge.

11. In a de-waxing process the step which consists of separating insoluble paraffin wax from a sustaining solvent by the addition of particles of litharge.

12. In a de-waxing process the step which consists of separating insoluble amorphous paraffin wax from a sustaining solvent by the addition of particles of litharge.

13. In a de-waxing process the step which consists of separating insoluble paraffin wax from a sustaining solvent by the addition of particles of litharge at least as fine as 200 mesh.

14. In a de-waxing process the step which consists of separating insoluble paraffin from a sustaining solvent by the addition of dry pulverulent litharge.

15. In a de-waxing process the step which consists of separating insoluble paraffin from a sustaining solvent by the addition of a crystalline type of litharge.

16. In a de-waxing process the step which consists of separating insoluble paraffin from a sustaining solvent by the addition of a pulverulent oxide of lead.

17. In a de-waxing process the step which consists of separating insoluble paraffin from a sustaining solvent by the addition of a lead compound having the precipitating properties of commercial pulverulent litharge.

18. In a de-waxing process the step which consists of separating insoluble paraffin from a sustaining solvent by the addition of a settling agent having the precipitating qualities of commercial pulverulent litharge.

LESLIE W. NAYLOR.